(12) United States Patent
Ijiri (10) Patent No.: US 8,567,877 B2
(45) Date of Patent: Oct. 29, 2013

(54) RUBBER CRAWLER AND CRAWLER-TYPE TRAVELING BODY

(75) Inventor: Masaaki Ijiri, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 265 days.

(21) Appl. No.: 13/059,576

(22) PCT Filed: Aug. 21, 2009

(86) PCT No.: PCT/JP2009/064668
§ 371 (c)(1),
(2), (4) Date: Feb. 17, 2011

(87) PCT Pub. No.: WO2010/021384
PCT Pub. Date: Feb. 25, 2010

(65) Prior Publication Data
US 2011/0169324 A1    Jul. 14, 2011

(30) Foreign Application Priority Data

Aug. 22, 2008  (JP) ................................ 2008-214317

(51) Int. Cl.
*B62D 55/24*    (2006.01)
(52) U.S. Cl.
USPC .......................................... 305/170; 305/166
(58) Field of Classification Search
USPC ......... 305/157, 165, 166, 167, 169, 170, 173, 305/174, 185
See application file for complete search history.

(56) References Cited

U.S. PATENT DOCUMENTS

| 4,844,560 A * | 7/1989 | Edwards et al. | 305/158 |
| 6,079,802 A * | 6/2000 | Nishimura et al. | 305/157 |
| 6,701,986 B2 * | 3/2004 | Tanaka | 152/209.14 |
| 6,848,757 B2 * | 2/2005 | Ueno | 305/115 |

(Continued)

FOREIGN PATENT DOCUMENTS

| CN | 1330009 A | 1/2002 |
| JP | 06-024367 A | 2/1994 |

(Continued)

OTHER PUBLICATIONS

Office Action issued Aug. 24, 2012 in Chinese Patent Application No. 200980132655.1 to Bridgestone Corporation, with translation.

*Primary Examiner* — Kip T Kotter
*Assistant Examiner* — Jean Charleston
(74) *Attorney, Agent, or Firm* — Sughrue Mion, PLLC (57) ABSTRACT

A rubber crawler which includes: a rubber crawler body having an endless belt shape and which has a left-right pair of rolling wheel passing surfaces on the inner circumferential surface thereof; a steel cord layer in which a plurality of steel cords extending in the crawler circumference direction are embedded in the rubber crawler body so as to be arranged in the crawler width direction, and a plurality of bias reinforcing layers that are disposed on the outer circumferential side of this steel cord layer in the rubber crawler body, in which the left-right pair of rolling wheel passing surfaces are disposed on the inner circumferential surface of the rubber crawler body at positions corresponding to the respective end portions in the crawler width direction of the steel cord layer and the plurality of bias reinforcing layers; the rubber crawler further includes: a rubber layer disposed between an innermost reinforcing layer that is positioned on the innermost side of the plurality of bias reinforcing layers and the steel cord layer, at least at positions corresponding to the end portions of the innermost reinforcing layer in the crawler width direction.

10 Claims, 4 Drawing Sheets

(56) References Cited

U.S. PATENT DOCUMENTS

| | | | |
|---|---|---|---|
| 6,890,042 B2 * | 5/2005 | Inaoka et al. | 305/173 |
| 2002/0195877 A1 * | 12/2002 | Tsuru et al. | 305/170 |
| 2007/0126286 A1 * | 6/2007 | Feldmann et al. | 305/165 |
| 2008/0164755 A1 * | 7/2008 | Matsuo | 305/171 |
| 2010/0096915 A1 * | 4/2010 | Hagio | 305/165 |

FOREIGN PATENT DOCUMENTS

| | | |
|---|---|---|
| JP | 2002-178965 A | 6/2002 |
| JP | 2003-267276 A | 9/2003 |
| JP | 2006-137301 A | 6/2006 |
| WO | 2006/043616 A1 | 4/2006 |

* cited by examiner

RUBBER CRAWLER AND CRAWLER-TYPE TRAVELING BODY

CROSS REFERENCE TO RELATED APPLICATIONS

This application is a National Stage of International Application No. PCT/JP2009/064668 filed on Aug. 21, 2009, which claims priority from Japanese Patent Application No. 2008-214317, filed on Aug. 22, 2008, the contents of all of which are incorporated herein by reference in their entirety.

TECHNICAL FIELD

The present invention relates to a rubber crawler and crawler-type traveling body that is mounted on construction machinery such as a hydraulic excavator or farm machinery, or another crawler-type vehicle.

Priority is claimed on Japanese Patent Application No. 2008-214317, filed Aug. 22, 2008, the content of which is incorporated herein by reference.

BACKGROUND ART

As a left-right pair of crawler-type traveling bodies to be mounted on a crawler-type vehicle, a constitution is known that is provided with a driving wheel, a driven wheel, a rubber crawler that is wound in an endless belt shape between both wheels, and a plurality of rolling wheels that are disposed on a left-right pair of rolling wheel passing surfaces that are formed on the inner circumferential surface of the rubber crawler and that are made to roll in response to the sending movement of the rubber crawler.

In order to increase the rigidity and raise the drive power endurance, for example as shown in Patent Document 1 given below, a steel cord layer in which a plurality of steel cords that extend in the crawler circumferential direction are embedded in a manner arranged in the width direction of the crawler and a plurality of bias reinforcing layers that are disposed on an outer circumferential side of this steel cord layer are provided in the rubber crawler body of this rubber crawler. The aforementioned rolling wheel passing surfaces are arranged on an inner circumferential surface of the rubber crawler body at positions corresponding to the respective end portions in the crawler width direction of the steel cord layer and the plurality of bias reinforcing layers.

Note that the flexural rigidity of the plurality of bias reinforcing layers is lower than the flexural rigidity of the steel cord layer.

[Patent Document 1] Japanese Unexamined Patent Application, First Publication No. 2006-137301

However, in the aforementioned conventional rubber crawler, the portion that is positioned on the lower side on the ground surface side in the inner circumferential surface is pressed to the ground surface by the rolling wheels during travel. Furthermore, a difference exists in flexural rigidity between the steel cord layer and the bias reinforcing layers. Accordingly, there has been the risk of the generation of cracks due to a large shear strain occurring at positions corresponding to the end portions of the innermost reinforcing layer in the crawler width direction, between the innermost reinforcing layer that is positioned on the most inner circumferential side among the plurality of bias reinforcing layers and the steel cord layer.

The present invention was achieved in view of the above circumstances, and has as its object to provide a rubber crawler and a crawler-type traveling body capable of inhibiting the generation of cracks at positions corresponding to the end portions of the innermost reinforcing layer in the crawler width direction, between the innermost reinforcing layer and the steel cord layer.

DISCLOSURE OF THE INVENTION

In order to solve the aforementioned issues and achieve such an object, the rubber crawler of the present invention includes: a rubber crawler body having an endless belt shape that has at least a left-right pair of rolling wheel passing surfaces on the inner circumferential surface of the rubber crawler body; a steel cord layer in which a plurality of steel cords extending in a crawler circumference direction are embedded in the rubber crawler body so as to be arranged in the crawler width direction, and a plurality of bias reinforcing layers that are disposed on the outer circumferential side of this steel cord layer in the rubber crawler body, in which the left-right pair of rolling wheel passing surfaces are disposed on the inner circumferential surface of the rubber crawler body at positions corresponding to the respective end portions in the crawler width direction of the steel cord layer and the plurality of bias reinforcing layers; the rubber crawler further includes: a rubber layer disposed between an innermost reinforcing layer that is positioned on the innermost side of the plurality of bias reinforcing layers and the steel cord layer, at least at positions corresponding to the end portions of the innermost reinforcing layer in the crawler width direction.

According to the present invention, since the rubber layer is disposed between the innermost reinforcing layer and the steel cord layer, at least at positions corresponding to the end portions of the innermost reinforcing layer in the crawler width direction (hereinbelow referred to as corresponding portions), it is possible to ensure a large thickness of the rubber material at the corresponding portions where the largest load is applied between the innermost reinforcing layer and the steel cord layer. Therefore, it is possible to inhibit the generation of cracks by suppressing shearing strain that occurs at the corresponding portions.

Here, the rubber layer may be formed with a material that has a loss tangent that is lower than the material that forms the rubber crawler body.

In this case, since the rubber layer is formed with a so-called low-loss material in which the loss tangent is lower than the material that forms the rubber crawler body, even if shearing strain repeatedly occurs at the corresponding portions, it is possible to suppress the amount of heat that is generated, and it is possible to suppress cracking that readily occurs at the corresponding portions due to degradation by this heat.

Also, the rubber layer may be disposed along the entire region in the crawler width direction between the steel cord layer and the innermost reinforcing layer; and the thickness of the middle portion of this rubber layer excluding the end portions thereof along the crawler width direction may be thinner than the thickness of the end portions.

In this case, since the rubber layer is disposed over the entire region in the crawler width direction between the steel cord layer and the innermost reinforcing layer, it is possible to precisely and efficiently dispose the rubber layer.

Also, since the thickness of the middle portion of the rubber layer that excludes the end portions in the crawler width direction is thinner than the thickness of the end portions, it is possible to prevent the flexural rigidity of the portion of the rubber crawler where the middle portion is positioned, at which the drive force from the driving wheel is mainly transmitted, from becoming too high by providing the rubber layer.

Accordingly, by providing the rubber layer, it is possible to prevent the load that is applied to the driving wheel from the rubber crawler from increasing and to prevent the fuel consumption from worsening.

Moreover, the inner surface of the rubber layer on the side of the steel cord layer may extend in a parallel manner along the crawler width direction over the entire region of the rubber layer, and among the outer surface on the side of the bias reinforcing layers, the portion that is positioned at the end portions in the crawler width direction may project out further to the side of the bias reinforcing layers than the portion that is positioned in the middle portion, and these plurality of bias reinforcing layers may respectively extend in the crawler width direction along the outer surface of the rubber layer, in the cross sectional view along the crawler width direction.

In this case, since the plurality of bias reinforcing layers respectively extend in the crawler width direction along the aforementioned outer surface of the rubber layer, in the cross sectional view along the crawler width direction, it is possible to reliably prevent the thickness of the rubber material from becoming thick at the portion where the middle portion is positioned.

Also, since the plurality of bias reinforcing layers respectively extend in the crawler width direction along the outer surface of the rubber layer in this way, and in these bias reinforcing layers the portions that correspond to the middle portion project out more to the inner circumferential side than the end portions in the crawler width direction. Accordingly, when the rubber crawler is tensioned from the inner circumferential surface side in the crawler circumference direction by the driving wheel and the driven wheel, it is possible to readily cause the portions of these bias reinforcing layers that correspond to the middle portion to project out to the outer circumferential side without being thrust out.

From the above, it is possible to inhibit as much as possible an increase in the flexural rigidity of the rubber crawler by providing the rubber layer, and it is possible to much more certainly prevent an increase in the load that is applied from the rubber crawler to the driving wheel.

Also, the crawler-type traveling body of the present invention is a crawler-type traveling body that includes: a driving wheel, a driven wheel, a rubber crawler that is wound in an endless belt shape between both wheels, and a plurality of rolling wheels that are disposed on at least a left-right pair of rolling wheel passing surfaces that are formed on the inner circumferential surface of the rubber crawler and that are made to roll in response to the sending movement of the rubber crawler; in which the rubber crawler is the rubber crawler of the present invention.

EFFECT OF THE INVENTION

According to the present invention, it is possible to inhibit the generation of cracks at positions corresponding to the end portions of the innermost reinforcing layer in the crawler width direction, between the innermost reinforcing layer and the steel cord layer.

BEST MODE FOR CARRYING OUT THE INVENTION

Hereinbelow, a rubber crawler according to an embodiment of the present invention shall be described with reference to FIG. 1 and FIG. 2.

Figure 1:
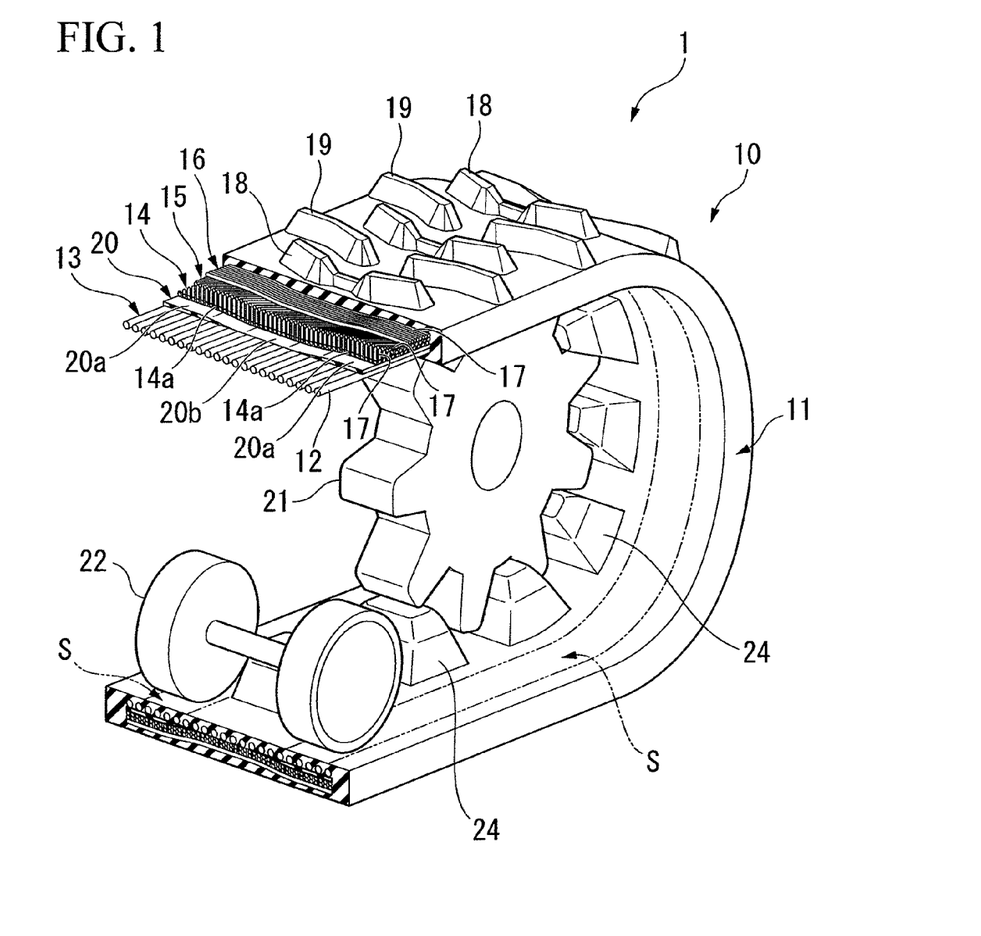
FIG. 1 is a perspective view that shows the essential portions of a crawler-type traveling body that includes a partial cross section of the rubber crawler that is shown as one embodiment according to the present invention.
Figure 2:
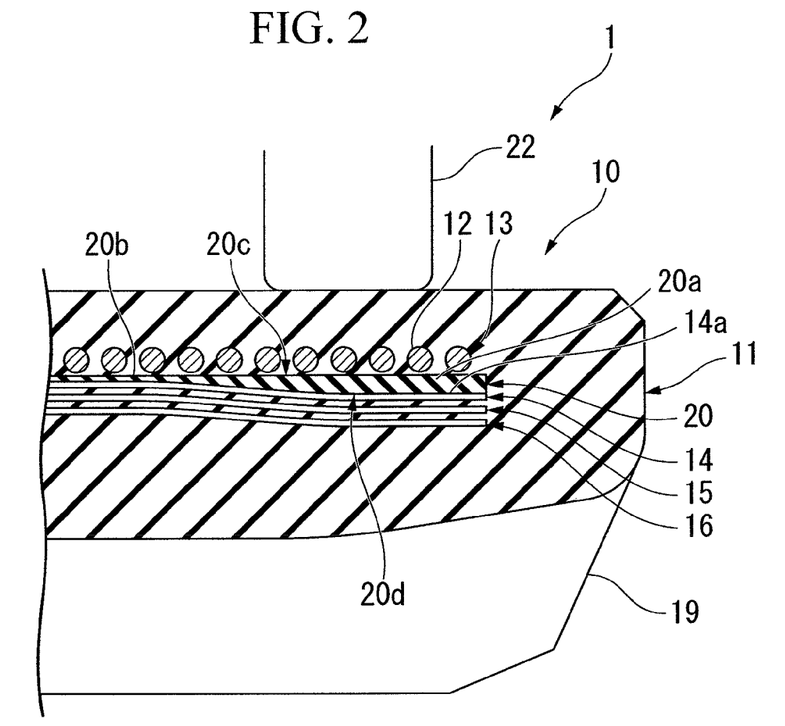
FIG. 2 is a partial enlargement of the crawler-type traveling body that is shown in FIG. 1.

For example, each of a left-right pair of crawler-type traveling bodies that are mounted on the lower portion of construction machinery such as a hydraulic excavator or farm machinery, or another crawler-type vehicle is, as shown in FIG. 1, includes a driving wheel 21, a driven wheel not illustrated, a rubber crawler 10 that is wound in an endless belt shape between both wheels, and a plurality of rolling wheels 22 that are disposed on each of a left-right pair of rolling wheel passing surfaces S that are formed on the inner circumferential surface of a rubber crawler body 11 in the rubber crawler 10 and that are made to roll in response to the sending movement of the rubber crawler 10. Note that in the illustrated example, the rubber crawler 10 is a so-called coreless rubber crawler in which a metal core is not embedded inside.

The driving wheel 21 is a sprocket, and is rotatably supported by a drive apparatus such as a hydraulic motor that is provided in the vehicle frame.

The driven wheel is supported in a freely rotating manner by the aforementioned vehicle frame.

Also, in the present embodiment, the plurality of rolling wheels 22 that are supported in a freely rotating manner by the aforementioned vehicle frame are provided on the inner circumferential surface side of the rubber crawler 10, at portions that are positioned between the driving wheel 21 and the driven wheel.

The rubber crawler 10 is provided with a rubber crawler body 11 that is formed with a rubber material in an endless belt shape, and on the inner circumferential surface of the rubber crawler body 11 a plurality of drive protrusions 24 are provided in a protruding manner with a regular interval over the entire circumference in the center portion in the crawler width direction. In the state of the aforementioned driving wheel 21 and the driven wheel being engaged with these drive protrusions 24, as a result of both wheels rotating, the rubber crawler 10 is made to perform a feed movement in the crawler circumferential direction. Note that the width of the rubber crawler body 11 is for example about 450 mm.

Also, the portions positioned on both sides of the inner circumferential surface of the rubber crawler body 11 interposing the drive protrusions 24 therebetween in the crawler width direction are the rolling wheel passing surfaces S that are made to be smooth surfaces over the entire circumference. Then, the plurality of rolling wheels 22 are made to roll about their axial lines on the rolling wheel passing surfaces S in conjunction with the feed movement of the rubber crawler 10.

Here, the rolling wheel passing surfaces S are positioned on the inner circumferential surface of the rubber crawler body 11 at positions corresponding to the respective end portions in the crawler width direction of a steel cord layer 13 and bias reinforcing layers 14 to 16 described below.

Note that among the rolling wheels 22, some are arranged so as to support from the upper side the portion of the inner circumferential surface of the rubber crawler 10 that is positioned on the lower side on the ground surface side, and the remainder are arranged so as to support from the lower side the portion of the inner circumferential surface of the rubber crawler 10 that is positioned on the upper side. The portion of the outer circumferential surface of the rubber crawler 10 that is positioned on the lower side is pressed onto the ground surface by the former rolling wheels 22, and the portion of the rubber crawler 10 that is positioned on the upper side is supported so as not to slacken by the latter rolling wheels 22.

On the outer circumferential surface of the rubber crawler body 11, a plurality of first lugs 18 and second lugs 19 are provided in a protruding manner at an interval in the crawler circumferential direction. The first lugs 18 and the second lugs 19 respectively extend in the crawler width direction. The first lugs 18 extend continuously in the crawler width direction, and are disposed at portions on the outer circumferential surface of the rubber crawler body 11 excluding the end portions in the crawler width direction. The second lugs 19 extend in a divided manner in the crawler width direction so as to be disposed at portions on the outer circumferential surface of the rubber crawler body 11 excluding the center portion in the crawler width direction. These lugs 18 and 19 are alternately disposed along the crawler circumference direction on outer circumferential surface of the rubber crawler body 11. Note that the interval of these lugs 18 and 19 that are adjacent in the crawler circumference direction is for example about 100 mm.

In the rubber crawler body 11, a steel cord layer 13 in which a plurality of steel cords 12 extending in the crawler circumference direction are embedded in a manner arranged in the crawler width direction, a first bias reinforcing layer 14 (innermost reinforcing layer) that is disposed on the outer circumferential side of the steel cord layer 13, a second bias reinforcing layer 15 and a third bias reinforcing layer 16 are provided.

A plurality of reinforcing cords 17 that consist of a steel cord with a smaller diameter than the steel cord 12 in the steel cord layer 13, or an organic fiber cord such as nylon are embedded in each of the bias reinforcing layers 14 to 16.

Among these, the first bias reinforcing layer 14 is positioned on the most inner circumferential side, and the third bias reinforcing layer 16 is positioned on the most outer circumferential side.

Also, the reinforcing cord 17 that is embedded in the first bias reinforcing layer 14 and the second bias reinforcing layer 15 extends in a direction that slants with respect to both of the crawler circumference direction and the crawler width direction (for example, 30° or more and 60° or less, and preferably 38° with respect to the crawler width direction), and a plurality of the reinforcing cord 17 is arranged in a direction that is perpendicular to the slanting direction. Also, the extension directions of the reinforcing cords 17 that are embedded in the first bias reinforcing layer 14 and the second bias reinforcing layer 15 are mutually reversed.

The reinforcing cord 17 that is embedded in the third bias reinforcing layer 16 extends in the crawler width direction, with a plurality of the reinforcing cord 17 being arranged in the crawler circumferential direction.

The sizes, that is, the widths, in the crawler width direction of the first to third bias reinforcing layers 14 to 16 are mutually equivalent. Moreover, each width of the bias reinforcing layers 14 to 16 is less than or equal to the steel cord layer 13. Also, the respective center portions in the crawler width direction of the steel cord layer 13 and the first to third bias reinforcing layers 14 to 16 match the center portion in the crawler width direction of the rubber crawler body 11. Thereby, the first to third bias reinforcing layers 14 to 16 are covered from the inner circumferential side by the steel cord layer 13 over the entire region. In the illustrated example, the widths of the first to third bias reinforcing layers 14 to 16 and the steel cord layer 13 are mutually equivalent.

Then, in the present embodiment, a rubber layer 20 is disposed at a position that corresponds to end portions 14a of the first bias reinforcing layer 14 in the crawler width direction (hereinbelow referred to as the corresponding positions), between the first bias reinforcing layer 14 that is positioned on the most inner circumferential side among the first to third bias reinforcing layers 14 to 16 and the steel cord layer 13. In the illustrated example, the rubber layer 20 is disposed over the entire region in the crawler width direction between the steel cord layer 13 and the first bias reinforcing layer 14. Also in the rubber layer 20, the thickness of a middle portion 20b that excludes end portions 20a in the crawler width direction is thinner than the thickness of the end portions 20a.

Note that the thickness of each end portion 20a in the crawler width direction of the rubber layer 20 is for example between 1 mm to 5 mm. Also, the thickness of the aforementioned middle portion 20b of the rubber layer 20 is for example between 0.5 mm to 2.0 mm. In the illustrated example, the center portion of the rubber layer 20 in the crawler width direction corresponds with the center portion of the rubber crawler body 11 in the crawler width direction, and the width of this rubber layer 20 is the same as the widths of the first to third bias reinforcing layers 14 to 16 and the steel cord layer 13. Also, each position in the crawler width direction of both end portions of the first to third bias reinforcing layers 14 to 16 in the crawler width direction agrees respectively with each position in the crawler width position of the end portions 20a of the rubber layer 20 in the crawler width direction.

Moreover, an inner surface 20c of the rubber layer 20 on the side of the steel cord layer 13 extends in a parallel manner along the crawler width direction over the entire region. Also, the steel cord layer 13 extends in a parallel manner along the crawler width direction over the entire region thereof. Thereby, the spacing between the inner surface 20c of the rubber layer 20 and the steel cord layer 13 is the same over the entire region.

Also, among an outer surface 20d of the rubber layer 20 on the side of the first to third bias reinforcing layers 14 to 16, a portion that is positioned at the end portion 20a in the crawler width direction projects out further to the side of the first to third bias reinforcing layers 14 to 16 than the portion positioned in the middle portion 20b. Moreover, in the outer surface 20d of the rubber layer 20, a portion positioned at the end portion 20a in the crawler width direction, and a portion positioned in the middle portion 20b respectively extend in parallel along the crawler width direction. A portion that connects the portion positioned at the end portion 20a in the crawler width direction and the portion positioned at the middle portion 20b slants toward the inner circumferential side heading toward the inside in the crawler width direction.

The first to third bias reinforcing layers 14 to 16 extend in the crawler width direction along the outer surface 20d of the rubber layer 20, in the cross sectional view along the crawler width direction.

From the above, the space between the outer surface 20d of the rubber layer 20 and the first bias reinforcing layer 14, the space between the inner surface 20c of the rubber layer 20 and the steel cord layer 13, and the space between the first to third bias reinforcing layers 14 to 16 that are mutually adjacent in the thickness direction of the rubber crawler body 11 are respectively equivalent over the entire region.

Also, in the present embodiment, the rubber layer 20 is formed with a material having a loss tangent that is lower than the loss tangent of the material that forms the rubber crawler body 11. For example, the rubber crawler body 11 is formed with a rubber material having a loss tangent of 0.2 to 0.4 at 30 degrees Celsius, and the rubber layer 20 is formed with a rubber material having a loss tangent of 0.1 to 0.2 at 30 degrees Celsius.

Moreover, the rubber crawler body 11 and the rubber layer 20 are respectively formed with NR-type rubber materials in which for example natural rubber comprises at least 50 weight percent. Thereby, it is possible to firmly bond the rubber crawler body 11 and the rubber layer 20 to each other.

Also, since the hardness of the rubber layer 20 that is used in the present embodiment is approximately Hb 60 to 80, it is possible to ensure the thickness of the rubber layer 20 in order to protect the steel cord layer 13, and it is possible to prevent peeling of the rubber layer by avoiding stress concentration during deformation of the rubber crawler 10.

Moreover, the rubber layer 20 in the present embodiment is provided so that the rubber layer 20, with respect to the aforementioned drive protrusions 24, does not extend to the position under the aforementioned drive protrusions 24. Accordingly, it is possible to prevent the flexural rigidity of the portion of the rubber crawler 10 where the aforementioned middle portion is positioned, at which the drive force from the driving wheel is mainly transmitted, from becoming too high by providing the rubber layer 20. Accordingly, by providing the rubber layer 20, it is possible to prevent the load that is applied to the driving wheel from the rubber crawler 10 from increasing and to prevent the fuel consumption from worsening.

As described above, according to the rubber crawler 10 of the present embodiment, the rubber layer 20 is disposed at the aforementioned corresponding portions between the first bias reinforcing layer 14 and the steel cord layer 13. Accordingly, it is possible to ensure a large thickness of the rubber material at the corresponding portions where the largest load is applied between the first bias reinforcing layer 14 and the steel cord layer 13. Therefore, it is possible to inhibit the generation of cracks by suppressing shearing strain that occurs at the corresponding portions.

Also, since the rubber layer 20 is formed with a so-called low-loss material in which the loss tangent is lower than the loss tangent of the material that forms the rubber crawler body 11, even if shearing strain repeatedly occurs at the corresponding portions, it is possible to suppress the amount of heat that is generated. Accordingly, it is possible to suppress cracking that readily occurs at the corresponding portions due to degradation by the heat.

Moreover, since the rubber layer 20 is disposed over the entire region in the crawler width direction between the steel cord layer 13 and the first bias reinforcing layer 14, it is possible to precisely and efficiently dispose the rubber layer 20.

Also, the thickness of the middle portion 20b of the rubber layer 20 that excludes the end portions 20a in the crawler width direction is thinner than the thickness of the end portions 20a. Accordingly, it is possible to prevent the flexural rigidity of the portion of the rubber crawler 10 where the aforementioned middle portion 20b is positioned, at which the drive force from the driving wheel 21 is mainly transmitted, from becoming too high by providing the rubber layer 20. Therefore, by providing the rubber layer 20, it is possible to prevent the load that is applied to the driving wheel from the rubber crawler 10 from increasing, and to prevent the fuel consumption from worsening.

Moreover, the first to third bias reinforcing layers 14 to 16 respectively extend in the crawler width direction along the outer surface 20d of the rubber layer 20, in the cross sectional view along the crawler width direction. Accordingly, it is possible to reliably prevent the thickness of the rubber material from becoming thick at the portion where the middle portion 20b is positioned.

Also, in this way, the first to third bias reinforcing layers 14 to 16 respectively extend in the crawler width direction along the outer surface 20d of the rubber layer 20. In these first to third bias reinforcing layers 14 to 16, the portions that correspond to the middle portion 20b project out more to the inner circumferential side than the end portions in the crawler width direction. Accordingly, when the rubber crawler 10 is tensioned from the inner circumferential surface side in the crawler circumference direction by the driving wheel 21 and the driven wheel, it is possible to readily cause the portions of these bias reinforcing layers 14 to 16 that correspond to the middle portion 20b to project out to the outer circumferential side without being thrust out.

From the above, it is possible to inhibit as much as possible an increase in the flexural rigidity of the rubber crawler 10 by providing the rubber layer 20, and it is possible to much more certainly prevent an increase in the load that is applied from the rubber crawler 10 to the driving wheel 21.

Note that the technical scope of the present invention is not limited to the above-described embodiment, and it is possible to add various modifications within the scope of the present invention.

For example, in the present embodiment, a plurality of drive protrusions 24 were provided in a protruding manner in the center portion in the crawler width direction on the inner circumferential surface of the rubber crawler body 11 with a regular interval in the crawler circumference direction over the entire circumference. But instead of this, engagement holes that the driving wheel 21 engages with may be formed in the rubber crawler body 11.

Also, the present embodiment shows a coreless rubber crawler, but a rubber crawler may also be used in which a metal core is embedded in the interior of the rubber crawler body 11.

Moreover, in the present embodiment, the widths of the first to third bias reinforcing layers 14 to 16 were mutually equivalent, but they may also be made to mutually differ, or the respective widths of the first to third bias reinforcing layers 14 to 16 may be made wider than the width of the steel cord layer 13.

Figure 3A:
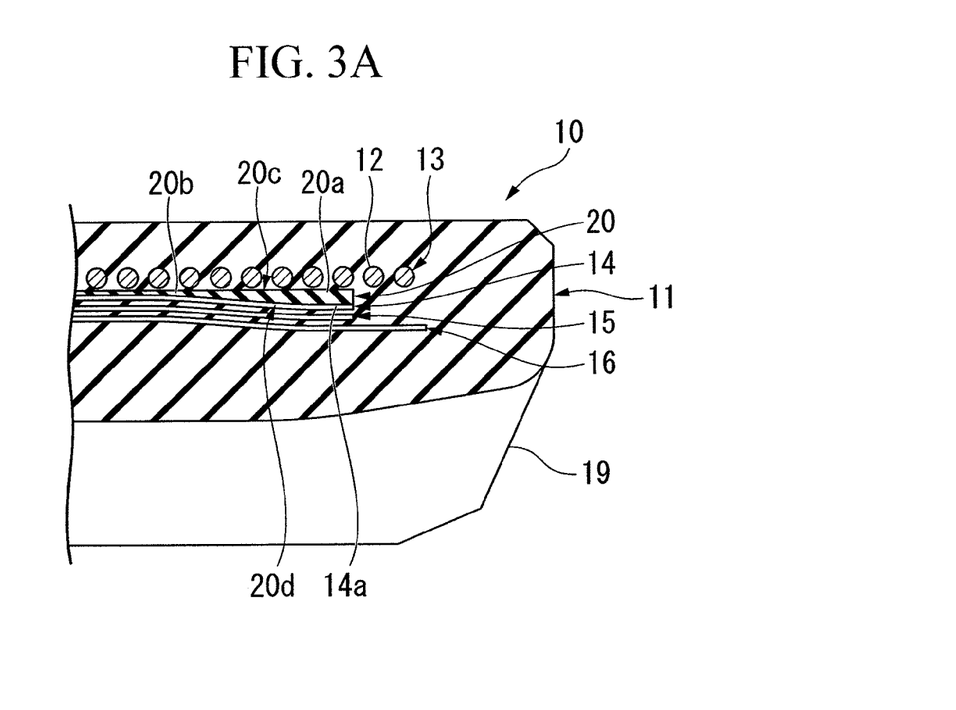
FIG. 3A is a partial lateral cross section along the crawler width direction of the rubber crawler shown as another embodiment according to the present invention.

Also, as shown for example in FIG. 3A, the width of the third bias reinforcing layer 16 may be made the same as the width of the steel cord layer 13 in the same manner as the aforementioned embodiment, and the widths of the first bias reinforcing layer 14 and the second bias reinforcing layer 15 may be made narrower than the widths of the steel cord layer 13 and the third bias reinforcing layer 16. The width of the rubber layer 20 may be equivalent to the widths of the first bias reinforcing layer 14 and the second bias reinforcing layer 15.

Figure 3B:
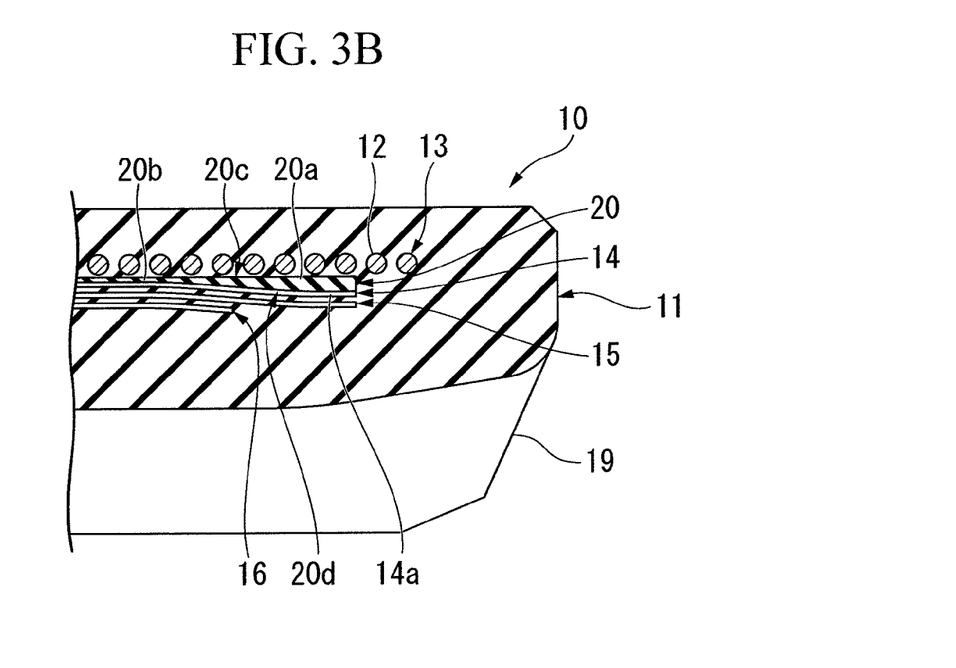
FIG. 3B is a partial lateral cross section along the crawler width direction of the rubber crawler shown as another embodiment according to the present invention.

Also, as shown for example in FIG. 3B, the width of the third bias reinforcing layer 16 may be made narrower than the widths of the first bias reinforcing layer 14 and the second bias reinforcing layer 15, and moreover the widths of the first bias reinforcing layer 14 and the second bias reinforcing layer 15 may be made narrower than the steel cord layer 13. Also, the width of the rubber layer 20 may be equivalent to the widths of the first bias reinforcing layer 14 and the second bias reinforcing layer 15.

Figure 3C:
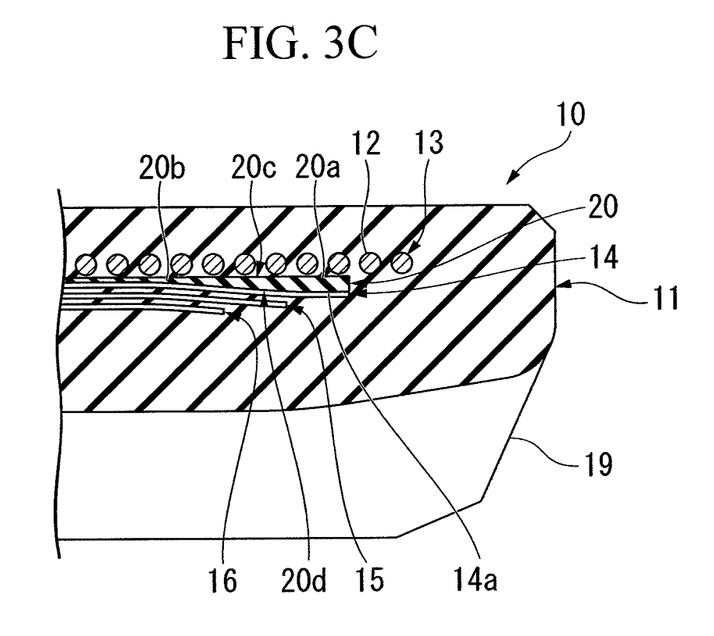
FIG. 3C is a partial lateral cross section along the crawler width direction of the rubber crawler shown as another embodiment according to the present invention.

Moreover, as shown for example in FIG. 3C, the width of the first bias reinforcing layer 14 may be made narrower than the width of the steel cord layer 13, the width of the second bias reinforcing layer 15 may be made narrower than the width of the first bias reinforcing layer 14, and the width of the third bias reinforcing layer 16 may be made narrower than the width of the second bias reinforcing layer 15. Also, the width of the rubber layer 20 may be made equivalent to the width of the first bias reinforcing layer 14.

Also, the embodiment shows a constitution that has the first to third bias reinforcing layers 14 to 16, but instead of this, it can be applied for example to a constitution that does not have the third bias reinforcing layer 16, or a constitution that has another bias reinforcing layer.

Moreover, the material that forms the rubber layer 20 may be suitably modified without being limited to that mentioned above.

Also, in the aforementioned embodiment, the inner surface 20c of the rubber layer 20 is extended in a parallel manner along the crawler width direction over the entire region. Furthermore, among the outer surface 20d of the rubber layer 20, the portion that is positioned at the end portions 20a in the crawler width direction projects out further to the side of the first to third bias reinforcing layers 14 to 16 than the portion positioned in the middle portion 20b. However, a suitable modification may be performed instead, for example the outer surface 20d of the rubber layer 20 may be extended in a parallel manner along the crawler width direction over the entire region, and among the inner surface 20c of the rubber layer 20. Furthermore, the portion that is positioned at the end portions 20a in the crawler width direction may be projected out further to the side of the steel cord layer 13 than the portion that is positioned in the middle portion 20b.

Moreover, the thickness of the rubber layer 20 may be made similar over the entire region in the crawler width direction.

Also, in the aforementioned embodiment, the rubber layer 20 was disposed over the entire region in the crawler width direction between the steel cord layer 13 and the first bias reinforcing layer 14. Instead of this, the rubber layer 20 may be disposed between the steel cord layer 13 and the first bias reinforcing layer 14, restricted to positions that correspond to the end portions 14a in the crawler width direction of the first bias reinforcing layer 14.

Moreover, in the embodiment, a left-right pair of the rolling wheel passing surfaces S were formed on the inner circumferential surface of the rubber crawler body 11, but three or more of the surfaces S may be formed.

In addition, the constituent elements in the aforementioned embodiment can be suitably replaced with widely known constituent elements within the scope of the present invention, and the aforementioned modifications may be suitably combined.

INDUSTRIAL APPLICABILITY

Between the innermost reinforcing layer and the steel cord layer, it is possible to inhibit the occurrence of cracking at positions corresponding to the end portion in the crawler width direction of the innermost reinforcing layer.

DESCRIPTION OF REFERENCE NUMERALS 1 crawler-type traveling body
10 rubber crawler
11 rubber crawler body
12 steel cord
13 steel cord layer
14 first bias reinforcing layer (innermost reinforcing layer)
14a end portion in crawler width direction of first bias reinforcing layer
15 second bias reinforcing layer
16 third bias reinforcing layer
20 rubber layer
20a end portion of rubber layer
20b middle portion of rubber layer
20c inner surface of rubber layer
20d outer surface of rubber layer
21 driving wheel
22 rolling wheel
S rolling wheel passing surface

The invention claimed is:

1. A rubber crawler comprising:
a rubber crawler body having an endless belt shape and comprising a left-right pair of rolling wheel passing surfaces on the inner circumferential surface thereof;
a steel cord layer in which a plurality of steel cords extending in a crawler circumference direction are embedded in the rubber crawler body so as to be arranged in the crawler width direction;
a plurality of bias reinforcing layers that is disposed on the outer circumferential side of this steel cord layer in the rubber crawler body; and
a rubber layer disposed between an innermost reinforcing layer that is positioned on the innermost side of the plurality of bias reinforcing layers and the steel cord layer, at least at positions corresponding to the end portions of the innermost reinforcing layer in the crawler width direction,
wherein the left-right pair of rolling wheel passing surfaces are disposed on the inner circumferential surface of the rubber crawler body at positions corresponding to the respective end portions in the crawler width direction of the steel cord layer and the plurality of bias reinforcing layers,
wherein the rubber layer is formed with a material that has a loss tangent that is lower than the loss tangent of the material that forms the rubber crawler body.

2. The rubber crawler according to claim 1, wherein the rubber layer is disposed along the entire region in the crawler width direction between the steel cord layer and the innermost reinforcing layer; and
the thickness of a center portion of the rubber layer in the crawler width direction is thinner than the thickness of the end portions.

3. The rubber crawler according to claim 2, wherein the inner surface of the rubber layer on the side of the steel cord layer extends in a parallel manner along the crawler width direction over the entire region thereof, and among the outer surface on the side of the bias reinforcing layers, the portion that is positioned at the end portions in the crawler width direction projects out further to the side of the bias reinforcing layers than the portion that is positioned in the center portion, and
the plurality of bias reinforcing layers respectively extend in the crawler width direction along the outer surface of the rubber layer, in the cross sectional view along the crawler width direction.

4. A crawler-type traveling body comprising:
a driving wheel, a driven wheel, a rubber crawler that is wound in an endless belt shape between both wheels, and a plurality of rolling wheels that are disposed on at least a left-right pair of rolling wheel passing surfaces that are formed on the inner circumferential surface of the rubber crawler and that are made to roll in response to the sending movement of the rubber crawler;

wherein the rubber crawler is the rubber crawler according to claim 3.

5. A crawler-type traveling body comprising:

a driving wheel, a driven wheel, a rubber crawler that is wound in an endless belt shape between both wheels, and a plurality of rolling wheels that are disposed on at least a left-right pair of rolling wheel passing surfaces that are formed on the inner circumferential surface of the rubber crawler and that are made to roll in response to the sending movement of the rubber crawler;

wherein the rubber crawler is the rubber crawler according to claim 2.

6. A crawler-type traveling body comprising:

a driving wheel, a driven wheel, a rubber crawler that is wound in an endless belt shape between both wheels, and a plurality of rolling wheels that are disposed on at least a left-right pair of rolling wheel passing surfaces that are formed on the inner circumferential surface of the rubber crawler and that are made to roll in response to the sending movement of the rubber crawler;

wherein the rubber crawler is the rubber crawler according to claim 1.

7. A rubber crawler comprising:

a rubber crawler body having an endless belt shape and comprising a left-right pair of rolling wheel passing surfaces on the inner circumferential surface thereof;

a steel cord layer in which a plurality of steel cords extending in a crawler circumference direction are embedded in the rubber crawler body so as to be arranged in the crawler width direction;

a plurality of bias reinforcing layers that is disposed on the outer circumferential side of this steel cord layer in the rubber crawler body; and a rubber layer disposed between an innermost reinforcing layer that is positioned on the innermost side of the plurality of bias reinforcing layers and the steel cord layer, at least at positions corresponding to the end portions of the innermost reinforcing layer in the crawler width direction, wherein the left-right pair of rolling wheel passing surfaces are disposed on the inner circumferential surface of the rubber crawler body at positions corresponding to the respective end portions in the crawler width direction of the steel cord layer and the plurality of bias reinforcing layers, wherein the rubber layer is disposed along the entire region in the crawler width direction between the steel cord layer and the innermost reinforcing layer; and the thickness of a center portion of the rubber layer in the crawler width direction is thinner than the thickness of the end portions.

8. The rubber crawler according to claim 7, wherein the inner surface of the rubber layer on the side of the steel cord layer extends in a parallel manner along the crawler width direction over the entire region thereof, and among the outer surface on the side of the bias reinforcing layers, the portion that is positioned at the end portions in the crawler width direction projects out further to the side of the bias reinforcing layers than the portion that is positioned in the center portion, and the plurality of bias reinforcing layers respectively extend in the crawler width direction along the outer surface of the rubber layer, in the cross sectional view along the crawler width direction.

9. A crawler-type traveling body comprising:

a driving wheel, a driven wheel, a rubber crawler that is wound in an endless belt shape between both wheels, and a plurality of rolling wheels that are disposed on at least a left-right pair of rolling wheel passing surfaces that are formed on the inner circumferential surface of the rubber crawler and that are made to roll in response to the sending movement of the rubber crawler;

wherein the rubber crawler is the rubber crawler according to claim 8.

10. A crawler-type traveling body comprising:

a driving wheel, a driven wheel, a rubber crawler that is wound in an endless belt shape between both wheels, and a plurality of rolling wheels that are disposed on at least a left-right pair of rolling wheel passing surfaces that are formed on the inner circumferential surface of the rubber crawler and that are made to roll in response to the sending movement of the rubber crawler;

wherein the rubber crawler is the rubber crawler according to claim 7.

* * * * *